United States Patent

Watkins et al.

[11] Patent Number: 6,129,898
[45] Date of Patent: Oct. 10, 2000

[54] NOX TRAP CATALYST FOR LEAN BURN ENGINES

[75] Inventors: William Lewis Henderson Watkins, Toledo, Ohio; Robert J. Kudla, Warren; Mohinder S. Chattha, Northville, both of Mich.

[73] Assignee: Ford Global Technologies, Inc., Dearborn, Mich.

[21] Appl. No.: 09/134,992

[22] Filed: Aug. 17, 1998

[51] Int. Cl.[7] .................................. B01J 8/02; B01J 8/00; B01J 23/00; B01J 23/32; C01B 21/00
[52] U.S. Cl. .................................... 423/239.1; 423/213.2; 423/213.5; 423/235; 502/308; 502/313; 502/324; 502/325
[58] Field of Search ............................. 423/213.2, 213.5, 423/235, 239.1; 502/308, 313, 324, 325

[56] References Cited

U.S. PATENT DOCUMENTS

| | | | |
|---|---|---|---|
| 3,873,469 | 3/1975 | Foster et al. . | |
| 3,984,591 | 10/1976 | Plumat et al. | 427/165 |
| 4,018,706 | 4/1977 | Inoue et al. . | |
| 4,127,510 | 11/1978 | Harrison et al. . | |
| 4,221,768 | 9/1980 | Inoue et al. . | |
| 4,668,299 | 5/1987 | Nanao et al. | 106/309 |
| 4,791,091 | 12/1988 | Bricker et al. | 502/303 |
| 4,900,712 | 2/1990 | Bar-llan et al. | 502/304 |
| 5,049,364 | 9/1991 | Yoshimoto et al. . | |
| 5,130,114 | 7/1992 | Igarashi | 423/652 |
| 5,187,137 | 2/1993 | Terui et al. | 502/241 |
| 5,200,384 | 4/1993 | Funabiki et al. | 502/304 |
| 5,286,700 | 2/1994 | Terui et al. | 502/324 |
| 5,389,606 | 2/1995 | Face | 505/473 |
| 5,409,671 | 4/1995 | Takemoto et al. . | |
| 5,473,887 | 12/1995 | Takeshima et al. . | |
| 5,610,117 | 3/1997 | Horiuchi et al. | 502/324 |
| 5,643,542 | 7/1997 | Leyrer et al. | 423/212 |
| 5,727,385 | 3/1998 | Hepburn | 60/297 |

FOREIGN PATENT DOCUMENTS 0 613 714 A2  9/1994  European Pat. Off. .

*Primary Examiner*—Tom Dunn
*Assistant Examiner*—Cam N. Nguyen
*Attorney, Agent, or Firm*—Lorraine S. Melotik; Roger L. May

[57] ABSTRACT

The invention is a method of treating exhaust gases generated by an internal combustion engine using a NOx trap in the exhaust gas system. The method comprises locating a nitrogen oxide trap in the exhaust gas passage and cycling the air/fuel ratio of the exhaust gases entering the trap between lean and rich, such that the trap absorbs nitrogen oxides during the lean cycle and desorbs the nitrogen oxides when the concentration of the oxygen in the exhaust gas is lowered as during a rich cycle. The trap comprises: (a) a tri-metal oxides made of aluminum-manganese-zirconium and (b) at least 0.1 wt. % platinum, the wt. % being based on the weight of said tri-metal oxide material. The desorbed nitrogen oxides may be converted over the precious metal to $N_2$ and $O_2$ by reductants like hydrocarbons present in the exhaust gas. The invention is also the catalyst trap material.

21 Claims, No Drawings

NOX TRAP CATALYST FOR LEAN BURN ENGINES

FIELD OF THE INVENTION

The invention is directed to a NOx trap catalyst useful to reduce nitrogen oxides in an oxidizing atmosphere (lean-burn operation). The catalyst comprises a sol-gel processed oxide of aluminum, manganese, and zirconium which incorporates platinum.

BACKGROUND OF THE INVENTION

Catalysts are employed in the exhaust systems of automotive vehicles to convert carbon monoxide, hydrocarbons, and nitrogen oxides (NOx) produced during engine operation into more desirable gases. When the engine is operated in a stoichiometric or slightly rich air/fuel ratio, i.e., between about 14.7 and 14.4, catalysts containing precious metals like palladium and rhodium are able to efficiently convert all three gases simultaneously. Hence, such catalysts are often called "three-way" catalysts.

It is desirable, however, to operate gasoline engines under "lean-burn" conditions where the A/F ratio is greater than 14.7, generally between 19 and 27, to realize a benefit in fuel economy. Such three-way catalysts are able to convert carbon monoxide and hydrocarbons but are not efficient in the reduction of NOx during lean-burn (excess oxygen) operation. Efforts have been made in developing lean-burn catalysts in recent years. One deficiency of some of the conventional lean-burn catalysts is that they are based on zeolite materials which are less than durable at the elevated temperatures necessary for their efficient catalytic operation in the exhaust gas system. Lean-burn catalysts act to reduce the NOx through the use of hydrocarbons and carbon monoxide over a catalyst, the hydrocarbons and carbon monoxide hence being in turn oxidized.

Recent efforts to solve the problem of NOx in lean-burn systems have focused on lean-NOx traps, i.e., materials which are able to absorb nitrogen oxides during lean-burn operation and are able to release them when the oxygen concentration in the exhaust gas is lowered. Hence, these traps are used with engine systems which operate primarily in a lean air/fuel ratio, but then when it is desired to purge the traps of NOx, the exhaust entering the trap is made richer, particularly rich of stoichiometric. Typical of catalyst materials used in conventional traps are an alkaline earth metal like barium combined with a precious metal catalyst like platinum. The widely held mechanism for this absorption phenomena is that during the lean-burn operation the platinum first oxidizes NO to $NO_2$ and the $NO_2$ subsequently forms a nitrate complex with the other material, e.g., the barium. In the regeneration mode as during a stoichiometric or rich environment, the nitrate is thermodynamically unstable, and the stored NOx is released. NOx then catalytically reacts over the platinum with reducing species in the exhaust gas like HC and CO to form $O_2$ and $N_2$. Hence according to one strategy for using lean-NOx traps, a hybrid-mode engine strategy is used to cycle the air/fuel ratio between extended periods of lean operations where the traps sorb NOx emissions, alternated with brief, fuel-rich intervals to desorb the adsorbed NOx and regenerate the lean-NOx trap. U.S. Pat. No. 5,473,887 discloses such operation of an exhaust purification device, the teachings of which are hereby expressly incorporated by reference herein.

The alkali metal and alkaline earth metals which are typically utilized for NOx sorption loaded on a porous support material, however, the serious drawback that they are readily poisoned by sulfur in the exhaust gas. Most fuels for automotive vehicles contain sulfur and when burnt, the sulfur is converted to sulfur compounds like $SO_2$. Over time, the sulfur compounds react with these alkali metal or alkaline earth trap materials forming sulfates which will not revert back to the sorption material. These sulfates are inactive for NOx sorption. The alkali metals are particularly problematic. As a result, the typical NOx trap material which uses precious metal and an alkaline earth like barium is strongly deactivated by sulfur in the fuel. European Patent Application 0613714A2 published Sep. 7th, 1994 proposes a solution to sulfur poisoning of such catalysts. It discloses that the catalyst should include a porous support like alumina and loaded thereon, platinum and/or palladium, and in one aspect, also at least two alkaline earth metals like Ba, Mb, Ca, or Sr. According to the application, by having more than one alkaline earth metal, the sulfur oxides react with the alkaline earth metals forming composite sulfates that decompose at temperatures sufficiently low to avoid poisoning the catalyst. Such catalysts have the deficiency that the alumina is subject to significant loses in surface area with the thermal cycling that takes place during operation.

According to the present invention, we have now found a NOx trap material which is resistant to sulfur poisoning, has excellent NOx conversion, and also has excellent thermal stability.

DISCLOSURE OF THE INVENTION

This invention, in one aspect, is directed to a method treating exhaust gas emissions from an internal combustion engine. It comprises locating a NOx trap material in an exhaust gas passage of an internal combustion engine; exposing the trap material to oxidizing engine exhaust gases generated by an engine operated at greater than the stoichiometric air/fuel ratio which include hydrocarbons, nitrogen oxides and carbon monoxides, whereby the trap material absorbs nitrogen oxides from the exhaust gas; and purging the absorbed nitrogen oxides by subjecting the nitrogen oxide trap to engine exhaust gases whose air/fuel ratio is stoichiometric or rich of stoichiometry. The NOx trap material comprises: (a) a tri-metal oxide of aluminum oxide, manganese oxide, and zirconium oxide made by sol-gel techniques; and (b) at least 0.1 wt. % platinum based on the weight of said tri-metal oxide. The platinum may be loaded on the tri-metal oxide or incorporated therein during the sol-gel processing. The trap may include other precious metals like rhodium or palladium.

Hence, the NOx trap absorbs NOx when the air/fuel ratio of exhaust gas flowing into the trap device is lean (of stoichiometric) and releases the absorbed NOx when the oxygen concentration in the exhaust gas is lowered, as during rich or stoichiometric operation of the engine. When the NOx is desorbed, it is converted to nitrogen and oxygen over the precious metal like platinum.

According to another aspect, the invention is the NOx trap material disclosed above.

Advantageously, we have found that by using the tri-metal oxide in the NOx trap material, the NOx conversion efficiency of the materials is maintained even in the presence of sulfur in the exhaust gas. We have found this to be based on the resistance of the sol-gel processed invention trap materials to forming sulfates, in contrast to conventional alkaline-earth absorbents like barium which are readily poisoned by sulfur. This allows for an improved trap material as compared to the prior conventional traps.

DESCRIPTION OF PREFERRED EMBODIMENTS

The invention method comprises locating a NOx trap material in the exhaust gas passage of an internal combustion engine and subjecting the material to cyclic air/fuel ratios from lean to rich as disclosed above. In particular, the nitrogen oxide trap is contacted with engine exhaust gases having a lean air/fuel ratio whereby the trap absorbs nitrogen oxides from the exhaust gas.

For practical application, the amount of nitrogen oxides absorbed in the trap would be monitored. This can be done, e.g., by monitoring the concentration of the nitrogen oxides in the exhaust gas entering and leaving the trap and watching for an increase in the concentration (nitrogen oxide breakthrough), or using estimating means such as torque/load measurements of the engine. Still other ways to determine the amount of nitrogen oxide absorbed in the trap, and consequently the available absorbent ability of the trap material, will be apparent to those skilled in the art.

When it is desired to purge the trap of absorbed nitrogen oxides, as for example when it is determined that the trap has reached a predetermined optimal fullness of absorbed NOx, it is subjected to a nitrogen oxide purge by passing exhaust gases whose air/fuel ratio is stoichiometric or preferably rich of stoichiometric. This may be accomplished by switching the engine to rich air/fuel operating mode or providing an increased concentration of, e.g., hydrocarbons into the gases entering the trap, such as by providing supplemental fuel or other hydrocarbons. Still other ways to increase the air/fuel ratio of the exhaust gas in the trap for purging will be apparent to those skilled in the art in view of the present disclosure. After the trap has been purged of nitrogen oxide, either partially or fully, the trap is again expected to be subjected to lean engine operation whereby the trap will absorb the nitrogen oxides from the exhaust gas. And so the absorb/purge cycling will be repeated.

The tri-metal oxide according to the present invention can be made from any sol-solution mixture of alumina, manganese oxide, and zirconia precursor materials as would be apparent to one skilled in the art in view of the present disclosure. For example, it can be made from metal salts such as halides, nitrates, alkoxides, the latter represented by formula $M(OR)_n$ wherein R represents preferably a lower alkyl group, M represents a metal element selected from the group consisting of Al, Mn, and Zr, n being the valence of M. By lower alkyl group is meant $C_1$ to $C_4$. The preferred tri-metal oxide forming materials are made from alkoxides of aluminum and zirconium, because these have good temperature characteristics and high gas-transport properties, and acetates of manganese because of their solubility. The final tri-metal oxide product contains aluminum oxide, manganese oxide, zirconium oxide in a weight percent preferably of 60–90 wt % aluminum oxide, 5–20 wt. % manganese oxide, and 5–20 wt. % zirconium oxide, i.e., based on a total of 100 wt. % of these three oxides in the product. More preferably, in the product oxide, these weight percents are 70–80 wt. %, 10–15 wt. %, and 10–15 wt. % of these three oxides, respectively.

The technique of making of sol-solutions is well known to those skilled in the art, which technique would be used in the present invention. In the case of using alkoxides, it generally involves (1) acid or base catalyzed hydrolysis of metal alkoxides in water and/or parent alcohol or (2) modification of metal alkoxides with organics such as acetyl-acetone and subsequent hydrolysis or (3) direct hydrolysis in water and peptization in the presence of acid. Exemplary alkoxides include, but are not limited to, aluminum sec-butyl oxide, aluminum isopropoxide, zirconium n-propoxide and zirconium ethoxide. Still others will be apparent to those skilled in the art in view of the present invention. While manganese salts like manganese acetoacetate, soluble in organic solvent, can be used to form the product, it is preferred to use water soluble salts of manganese like manganese acetate or manganese nitrate which can be incorporated into the sol solution of the other metals. For example, aluminum sec-butyl oxide can be hydrolyzed in water and peptized in the presence of dilute mineral acids to obtain alumina sol. The zirconia sol can be prepared, for example, using a dilute mineral acid and zirconium n-propoxide in ethanol and water. The alumina sol can be combined with the zirconia sol and a manganese acetate added in to form a product according to the present invention. More specifically, an aluminum isopropoxide solution (in 2-butanol) can be mixed with zirconium n-propoxide (in propanol) and diluted with anhydrous isopropyl alcohol. Manganese acetate dissolved in glacial acetic acid can be added to the mixed alkoxides. After a time, the solvent is removed and the resulting tri-metal oxide product dried.

This tri-metal oxide product material can be contacted with, e.g., chloroplatinic acid solution to deposit, by incipient wetness technique, platinum. The impregnated product would be dried and calcined generally before use. Alternately, the platinum could be included in the sol as, e.g., platinum 2-ethyl hexanoate. In this case, rather than the platinum being merely loaded on the tri-metal oxide it would be included within the tri-metal oxide. In the case of nitrates or halides, it would be made by hydrolysis and subsequent peptization as is well known in the art of sol-gel coatings. Use of nitrates or halides has the drawback that salts are present.

The sols may be made individually and then mixed in the proper proportions to yield the desired resultant oxide. After the sols are mixed, the mixture is dried to remove solvent and yield the composite oxide. This may be done at room temperature or enhanced by elevated temperature drying. Volatiles are generally completely removed and powders are generally pyrolyzed in air at an elevated temperature such as 600° C. (10° C./minute, hold 4 hours). The support may include other materials added to the tri-metal oxide described above in minor proportions to stabilize or otherwise enhance the support properties. Stabilizer materials commonly included in oxide materials to be used at elevated temperatures would be useful, for example, Ce, La, Ti, or alpha-alumina. When included they would be used in an amount up to about 25 wt. % based on the total weight of the oxide.

As discussed above, the catalyst material of this invention includes platinum. That is, platinum is loaded on the oxide after it is formed by sol-gel techniques or is included in the sol during the sol-gel processing of the oxide. The platinum is incorporated in an amount of at least 0.1 wt. % based on the total weight of the oxide. Preferably, the platinum is employed in an amount of 0.1 to 3.0 wt. % based on the weight of the oxide, more preferably being included in about 1.0 to 2.0 wt. %. For wet impregnation, as one example, the precious metal may be provided from soluble precious metal compounds. Water soluble compounds are preferred, including, but not limited to nitrate, salts. In addition to this incorporation from a liquid phase, the precious metal, e.g., platinum, may be provided by sublimation of platinum chloride or other volatile platinum salts: by solid state exchange in the 300–500° C. temperature range using labile platinum compounds. In addition to platinum, the catalyst may include rhodium in relatively small amounts, optimally 0.01–0.2 wt. % based on the weight of the composite support. Rhodium is desirably included since it provides a broadening of the NOx conversion window due to increased conversion efficiency of nitrogen oxides at higher temperatures.

For useful application in an exhaust system, a coating of this trap material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–100 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the oxide (without the platinum) may be applied to the substrate and then impregnated with the precursor platinum solution. Alternately, the oxide material with platinum may be washcoated onto the substrate by forming a slurry thereof. Generally, the oxide is provided first on the substrate and then impregnated with a platinum precursor. Still other ways of providing the invention product will be apparent to those skilled in the art in view of the present disclosure, the method not being critical to the present invention. Generally, for use in an exhaust system this impregnated washcoat is subjected to elevated temperatures to decompose and eliminate the functional group of the platinum precursor. It may be further subjected to calcining. Optimally, the substrate carries a washcoat of the final trap material in an amount of between about 15% and 45% by weight based on the weight of the substrate (e.g., monolith).

When the trap is placed in use, oxygen present in the exhaust gas will oxidize the platinum to platinum oxide which at high temperatures decomposes to platinum and oxygen. Thus it often exists as a mixture of platinum and its oxides.

As discussed above, the present invention NOx trap catalyst has high nitrogen oxide conversion efficiency and is resistant to sulfur poisoning. It is believed that this improved resistance to sulfur poisoning is due to the lower reactivity of sulfur oxides with zirconium oxide as compared to its reactivity with more basic alkaline earth oxides, e.g., BaO. It is also believed that because the tri-metal oxide is made by sol-gel techniques, as compared to a physical mixture of the three oxides, the product involves chemical bonds formed between the oxides which make them it more resistant to reaction with sulfur oxides as compared to the individual oxides. Neither the validity nor understanding of this theory is necessary for the practice of the invention. Rather it is provided in an attempt to explain the improvement of the invention.

As disclosed above, according to another aspect of the invention, it comprises an exhaust gas treatment system comprising the NOx trap disclosed herein disposed in the exhaust gas passage of a internal combustion engines. The exhaust gas treatment system of this invention may include another catalyst device as, for example, a catalytic converter employing a conventional three-way catalyst containing palladium, etc., or a lean-burn catalyst such as one containing transition metals like silver, copper, etc. These catalysts, e.g., the three-way catalyst, can be placed upstream of the NOx trap, hence closer to the engine. In such an arrangement, the three-way catalyst being preferably closely mounted to the engine would warm up quickly and provide for efficient engine cold start emission control. The NOx trap would be positioned downstream of the three-way catalyst where the lower exhaust gas temperature enables maximum NOx trap efficiency. Also, with the NOx trap positioned downstream of the three-way catalyst in a remote location, it is protected against very high exhaust gas temperatures which could damage it.

As discussed above, during periods of lean-burn engine operation when NOx passes through the three-way catalyst, NOx is stored on the trap. The NOx trap is periodically regenerated by short periods or intervals of slightly rich engine operation. Thus, the stored NOx is then released (purged) from the trapping material and is catalytically reduced over the precious metal like platinum in the trap by the excess hydrocarbons and other reductants like CO and $H_2$ present in the exhaust gas. In general, the released NOx is efficiently converted to $N_2$ and $O_2$, which efficiency is enhanced when rhodium is contained within the NOx trap washcoat. However, one may wish to place a second three way catalyst downstream of the NOx trap in order to further aid in this regard. As disclosed above, the invention NOx trap is to be used for gasoline engines where during the lean-burn portion the air/fuel ratio is usually in the range 19–27.

EXAMPLE 1

Aluminum isopropoxide solution (50% in 2-butanol, 40.8 g) and zirconium n-propoxide (70% in propanol, 9.5 g) are placed in a flask and diluted with 50 ml anhydrous isopropyl alcohol. Manganese acetate, 3.5 g, is dissolved in 20 ml glacial acetic acid; cooled to room temperature and added portion-wise to the alkoxide solution with continuous stirring. To this well-mixed solution, 4.2 ml water is added while being continuously stirred. The reaction mixture is allowed to stay at room temperature for twenty hours and then the solvent is removed on a rotary evaporator under reduced pressure. The resulting tri-metal oxide product is dried at 110° C. for two hours and calcined at 500° C. for four hours.

Five grams of this material are brought in contact with chloroplatinic acid solution to deposit, by incipient wetness technique, 2% Pt by weight. The sample was kept at room temperature 18 hours, at 110° C. for two hours, and then calcined at 500° C. for five hours. The resulting powder sample is evaluated on a flow reactor for NOx reduction. The feed gas composition is given below (1 g).

Feed Gas Composition:
Space Velocity=25,000 hr
HC=40 ppm
CO=2400 ppm
$H_2$=800 ppm
NOx=600 ppm
$O_2$=1400 ppm
$CO_2$=10.0%
$H_2O$=10.0%

The feed gas is maintained fuel-lean by adding $O_2$ (6%) for one minute and then rendered rich by adding CO (1%)

for an equal interval. The feed gas composition modulation is maintained during the catalyst evaluation. The NOx conversion for the Pt/tri-metal oxide sample is 86% at 350° C. The NOx conversion under identical conditions on a comparative example sol-gel prepared 2% Pt/Al$_2$O$_3$ catalyst is 74%. This comparative example is not according to the present invention.

EXAMPLE 2

The catalyst is prepared and evaluated as described in Example 1 except that 4.5 g manganese acetate is employed in the preparation of the tri-metal oxide. The NOx conversion is 85%.

EXAMPLE 3

The experiment is carried out as described in Example 1, except that 0.05 Rh is included in the catalyst composition. The NOx conversion is 87%.

EXAMPLE 4

The experiment described in Example 1 is repeated by employing 2.5% Pt loading by weight. The NOx conversion is 87%.

EXAMPLE 5

The tri-metal oxide is prepared as described in Example 1, and is impregnated with 1.5% Pt, 0.1% Rh and 0.25% Pd. The sample is evaluated according to the procedure of Example 1. The NOx conversion is 84%.

EXAMPLE 6

Lanthanum oxide (2.5% by wt.) is deposited on the tri-metal oxide of Example 1 by employing lanthanum acetate solution, drying and calcination at 450° C. for 4 hours. The resulting sample is impregnated with 2% Pt by wt. Catalyst evaluation, as described in Example 1, provided 85% NOx conversion.

EXAMPLE 7

Ceria (3% by wt.) is deposited on the catalyst sample of Example 6. The catalyst evaluation as described in Example 1, provides 83% NOx conversion.

EXAMPLE 8

The preparation is carried out as described in Example 1 with the only difference that 12.5 g (70% in propanol) zirconium n-propoxide solution was used. The catalyst evaluation of Example 1 provides 82% NOx conversion.

EXAMPLE 9

The catalyst sample from Example 2 is treated with titanium butoxide solution to deposit 2% TiO$_2$ by weight. The resulting catalyst sample is evaluated as described in Example 1. The maximum NOx conversion is 87%.

EXAMPLE 10

The catalysts of Example 1 are evaluated by including 20 ppm SO$_2$ in the feed gas. The NOx conversion from this tri-metal oxide sample is 79% while from the control (comparative) sample is 64%.

EXAMPLE 11

The experiment described in Example 1 is carried out by employing 50 g of aluminum isopropoxide solution instead of the amount described therein. The NOx conversion was 85%.

We claim:

1. A method for treating exhaust gases from an internal combustion engine using a nitrogen oxide trap, said method comprising the steps of:
   locating in the exhaust gas passage of said internal combustion engine a nitrogen oxide trap material comprising:
      (a) a tri-metal oxide of aluminum oxide, manganese oxide, and zirconium oxide made by sol-gel techniques; and
      (b) at least 0.1 wt. % platinum deposited on said oxide or incorporated therein during sol-gel technique processing, the wt. % of platinum being based on the weight of said oxide;
   exposing said nitrogen oxide trap to oxidizing engine exhaust gases having a lean of stoichiometric air/fuel ratio to absorb nitrogen oxides from said exhaust gas;
   purging said absorbed nitrogen oxides from said trap by subjecting said nitrogen oxide trap to engine exhaust gases whose air/fuel ratio is stoichiometric or rich of stoichiometry.

2. The method according to claim 1 wherein said tri-metal oxide comprises aluminum oxide, manganese oxide, zirconium oxide in weight percents of 60–90 wt. %, 5–20. %, and 5–20 wt. %, respectively.

3. The method according to claim 1 wherein said platinum comprises about 0.1–3.0 wt. %, based on the weight of the oxide.

4. The method according to claim 1 wherein said oxide further comprises materials selected from the group consisting of cerium oxide, lanthanum oxide, titanium oxide, and alpha-alumina.

5. The method according to claim 1 which further comprises locating a three-way catalyst or a lean-nitrogen oxide catalyst upstream of said nitrogen oxide trap.

6. The method according to claim 1 which further comprises locating a three-way catalyst downstream of said nitrogen oxide trap.

7. The method according to claim 1 wherein the tri-metal oxide incorporating platinum is carried on a substrate.

8. The method according to claim 7 wherein said substrate is selected from corderite, metal, or ceramic honeycomb materials.

9. The method according to claim 7 wherein said substrate carries about 25–35 weight percent of said NOx trap material.

10. The method according to claim 1 wherein said locating step comprises first forming said nitrogen oxide trap material by impregnating said tri-metal oxide with a solution of said platinum, and subsequently drying the material to remove said solvent.

11. The method according to claim 1 wherein rhodium, palladium, or their mixture is also included with said platinum.

12. The method according to claim 1 wherein said sol-gel techniques include making a sol by hydrolyzing alkoxides of the at least one of aluminum, manganese, and zirconium in alcohol and water.

13. The method according to claim 12 wherein said alkoxides are represented by the formula M(OR)$_n$ wherein R represents an alkyl group, M represents a metal element selected from the group consisting of Al, Mn, and Zr, and n being the valence of M.

14. The method according to claim 13 wherein said alkyl group is a C$_1$–C$_4$ group.

15. A catalyst useful in a NOx trap, said catalyst comprising:

(a) a tri-metal oxide of aluminum oxide, manganese oxide, and zirconium oxide made by sol-gel techniques; and (b) at least 0.1 wt. % platinum deposited on said oxide or incorporated therein during sol-gel technique processing, the wt. % of platinum being based on the weight of said oxide.

16. The catalyst according to claim 15 wherein said tri-metal oxide comprises aluminum oxide, manganese oxide, zirconium oxide in weight percents of 60–90 wt. %, 5–20 wt. %, and 5–20 wt. %, respectively.

17. The catalyst according to claim 15 wherein said platinum comprises about 0.1–3.0 wt. %, based on the weight of the oxide.

18. The catalyst according to claim 15 wherein said oxide further comprises materials selected from the group consisting of cerium oxide, lanthanum oxide, titanium oxide, and alpha-alumina.

19. The catalyst according to claim 15 wherein the tri-metal oxide incorporating precious metal is carried on a substrate.

20. The catalyst according to claim 19 wherein said substrate is selected from corderite, metal, or ceramic honeycomb materials.

21. The catalyst according to claim 15 wherein rhodium, palladium, or their mixture is also included with said platinum.

\* \* \* \* \*